No. 622,313. Patented Apr. 4, 1899.
G. W. WOODVINE.
STOVEPIPE COUPLING.
(Application filed June 13, 1898.)
(No Model.) 2 Sheets—Sheet 1.
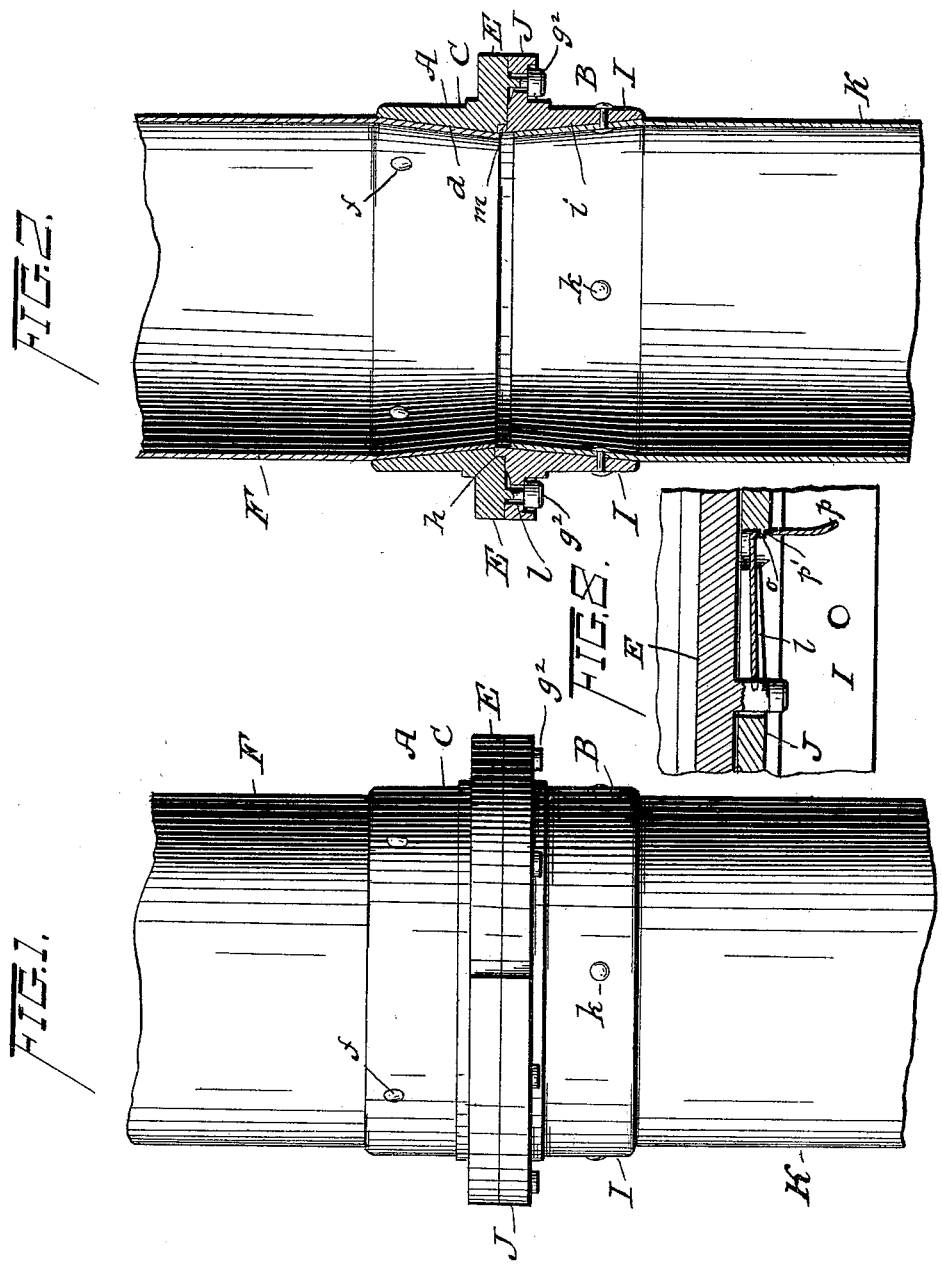
Witnesses:
Saml R. Turner
C. C. Hines
Inventor:
George W. Woodvine,
By R. S. & A. B. Lacy,
Attorneys.

No. 622,313. Patented Apr. 4, 1899.
G. W. WOODVINE.
STOVEPIPE COUPLING.
(Application filed June 13, 1898.)
(No Model.) 2 Sheets—Sheet 2.
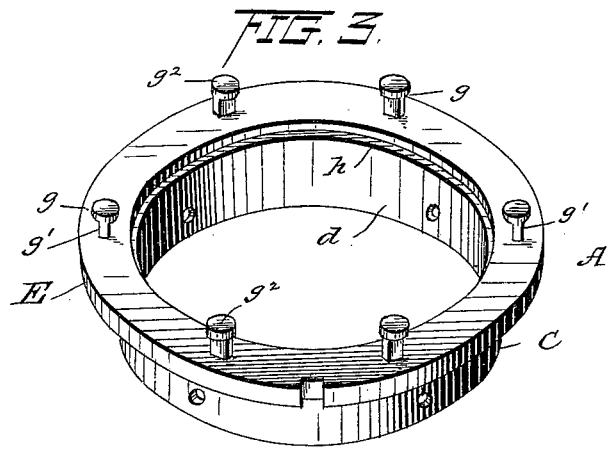
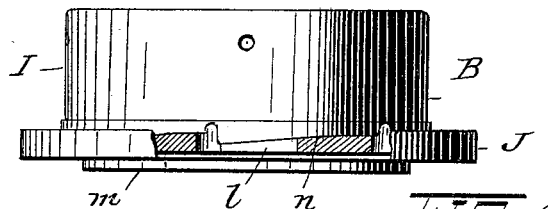
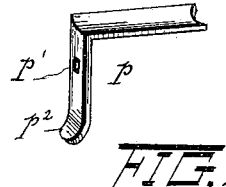
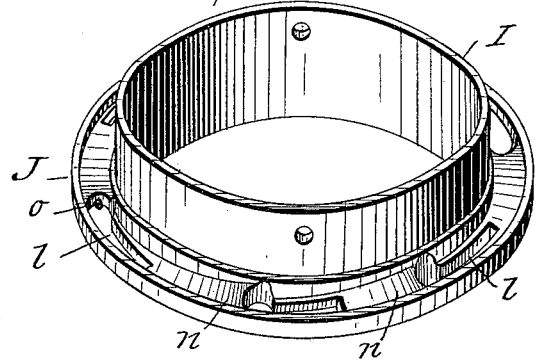
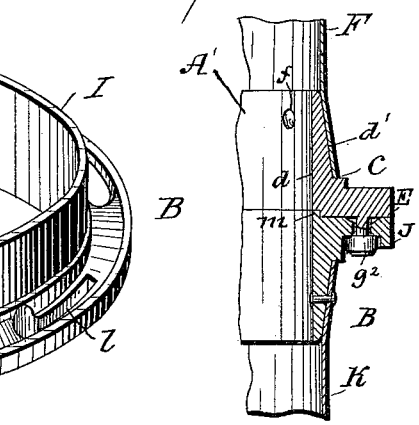
Witnesses:
Sam R Turner
C. C. Hines
Inventor:
George W. Woodvine,
By Lacey,
Attorneys.
THE NORRIS PETERS CO., PHOTO-LITHO., WASHINGTON, D. C.

UNITED STATES PATENT OFFICE.

GEORGE W. WOODVINE, OF REXBURG, IDAHO.

STOVEPIPE-COUPLING.

SPECIFICATION forming part of Letters Patent No. 622,313, dated April 4, 1899.

Application filed June 13, 1898. Serial No. 683,341. (No model.)

*To all whom it may concern:*

Be it known that I, GEORGE W. WOODVINE, a citizen of the United States, residing at Rexburg, in the county of Fremont and State of Idaho, have invented certain new and useful Improvements in Stovepipe-Couplings; and I do hereby declare the following to be a full, clear, and exact description of the invention, such as will enable others skilled in the art to which it appertains to make and use the same.

This invention relates to certain new and useful improvements in stovepipe-couplings, and has for its object to provide a two-part coupling of this character which is simple, cheap, and durable in construction and capable of being readily and quickly assembled and disassembled in coupling and uncoupling adjoining pipe-sections without employing tools.

A further object is to provide a coupling in which the locking parts are so constructed and arranged as to be shielded from dust and dirt and which is designed to form an absolutely smoke-tight joint without the necessity of employing extraneous packing means.

With these and other objects in view the invention consists in certain novel features of construction, combination, and arrangement of parts, which will be more fully hereinafter described, and particularly pointed out in the appended claim.

In the accompanying drawings, forming part of this specification, Figure 1 is a side elevational view showing two adjoining pipe-sections united by my improved coupler. Fig. 2 is a longitudinal section of same. Fig. 3 is an inverted perspective view of the male member of the coupling. Fig. 4 is a similar view of the female member thereof. Fig. 5 is a sectional view of same, showing the construction of one of the keyhole-slots and its inclined face. Fig. 6 is a detail perspective view of the locking-key. Fig. 7 is a detail sectional view of a modified form of coupling member. Fig. 8 is a broken detail sectional view through the head-flanges of the coupling members, showing the locking-key applied thereto.

Referring now more particularly to the said drawings, wherein like letters of reference designate corresponding parts throughout the several views, A and B represent the two parts of the coupling, which for convenience of description are termed the "male" and "female" members. The male member A consists of a sleeve C, having its inner wall $d$ inclined and gradually decreasing in diameter from the outer to the inner end thereof and provided at said inner end with an annular head-flange E, extending at right angles thereto. The said sleeve is adapted to receive the meeting end of a stovepipe-section F and is provided with a series of openings for the passage of rivets $f$, which secure it to the said pipe-section. The inclined inner wall of the sleeve insures the firm retention of the end of the pipe-section therein independent of the rivets and adapts the sleeve for receiving the ends of pipes, which vary to some extent from the standard size on account of defects in manufacture, it being understood that the sleeve may be made as long as desired and that smaller stovepipe-sections are forced therein until a firm joint connection between the coupling-section and the pipe is afforded. The head-flange E is provided with a series of locking-studs $g$, projecting from its under side or face, each of said studs comprising in its construction a shank $g'$, having parallel flat sides arranged longitudinally of the flange, and a head $g^2$. A groove or recess $h$ is provided in the sleeve at the point of junction of the latter with the flange for the reception of a flange on the female member of the coupling, as will now be described. The female member also consists of a sleeve I, provided with an inclined inner wall $i$ and a circumferential head-flange J. Into said sleeve is fitted the end of a pipe-section K, which is to be rigidly coupled to the adjoining end of the pipe-section F and which is secured thereto by rivets $k$, passing through openings therein. The head-flange J is provided with a series of equidistant keyhole-slots $l$, equal in number to the locking-studs employed on the male member, and with an upwardly-projecting flange $m$, which enters the groove or recess $h$ in the male member and effects an absolutely smoke-tight connection therewith when the members are coupled, as clearly shown in Fig. 2. The parallel walls of the contracted portions of each keyhole-shaped slot are formed on their under or outer sides with inclined faces $n$, which gradually increase in depth from the enlarged portion of the slot to the contracted portion thereof.

In forming a joint the head-flange of the male member is brought into contact with the head-flange of the female member and the locking-studs of the former are inserted in the large portions of the keyhole-slots of the latter until the base portions of the head of each locking-stud are arranged in alinement with the inclined faces of the walls of the contracted portions of said slot, and then one of said members is partially rotated to cause the heads of the studs to ride upon the said inclined faces and thereby draw the head-flanges of the coupling members tightly together. It will be noted that when the two members of the coupling are united in the manner just described the keyhole-slots of the female member and the locking-studs of the male member will be covered and shielded by the flange of the said latter member, so as to avoid choking up of the parts by dust and dirt falling from above, the base portion of the flange of the female member being preferably formed with a slight groove or recess also to shield the locking parts and prevent water from dripping down therein or the access of dirt thereto from the sides. It will also be noted that by providing the female member with an upwardly-projecting flange forming a continuation of its sleeve portion and projecting into a recess in the bottom portion of the sleeve of the male member an absolutely smoke-tight joint is provided and the necessity of employing extraneous packing means is avoided. The two parts of the coupling may be quickly and conveniently uncoupled, whenever it is desired to disengage the pipe-sections, by simply partially rotating one of said sections in the reverse direction to that by which the couplings are connected, in the manner hereinbefore described, so as to bring the heads of the studs into the enlarged portions of the keyhole-slots, when the sections may be readily and conveniently disengaged from each other.

The parts just described may constitute the complete coupling; but I prefer to employ a suitable detent or locking-key to coact with one of the locking-studs and the end wall of the enlarged portion of one of the keyhole-slots to prevent accidental separation of the coupling members. To this end I provide the end wall of the large portion of one of the keyhole-slots with a lug $o$, which is adapted to engage a locking-key $p$ of the form shown in Fig. 6. This key is L-shaped and has the forward end of its short arm provided with a groove or recess to receive the edge of the shank of one of the locking-studs. The long arm of the key is provided with a slot $p'$ and terminates in a curved finger-piece $p^2$. In operation after the coupling members have been engaged the key is inserted into the slot, so that the recessed portion of this said shorter arm will abut against the shank of the locking-stud therein and the longer arm thereof is retained by the lug $o$ engaging its slot $p'$. When this is done, it will be seen that the finger-piece of the locking-key projects downwardly, where access to it may be conveniently obtained when desired, and that the two parts of the coupling are held positively against accidental retrograde movement.

In Fig. 7 I have shown the male coupling member $A'$ provided with a straight inner wall and an inclined outer wall $d'$. It is desirable in some cases to construct both coupling members in this manner in order that the ends of the pipe-sections may be fitted on the exterior thereof.

It will of course be understood that changes in the form, proportion, and minor details of construction may be made within the scope of the invention without departing from the spirit or sacrificing any of the advantages thereof.

Having thus fully described my invention, what I claim as new and useful, and desire to secure by Letters Patent, is—

In a stovepipe-coupling, the combination of a male member consisting of a sleeve provided at its lower end with a circumferential head-flange provided on its under side with a series of locking-studs, and a female member also consisting of a sleeve provided with a circumferential head-flange at its upper end, said flange having a series of keyhole-slots to receive the studs and a lug projecting into the enlarged portion of one of said slots, and an L-shaped locking-key having its long arm terminating in a finger-piece and provided with a slot to receive said lug, and its short arm adapted to be inserted into the keyhole-slot with its free end bearing against the shank of the stud at the contracted portion thereof, substantially as described.

In testimony whereof I affix my signature in presence of two witnesses.

GEORGE W. WOODVINE.

Witnesses:
JOSIAH HENDRICKS,
HYRUM RICKS.